United States Patent
Song et al.

(10) Patent No.: US 12,533,901 B2
(45) Date of Patent: Jan. 27, 2026

(54) IODONIUM SALT INITIATOR AND PROCESSING-FREE THERMALLY SENSITIVE PLATE PRECURSOR CONTAINING THEREOF, AND PROCESSING-FREE THERMALLY SENSITIVE PLATE AND USE THEREOF

(71) Applicant: Lucky Huaguang Graphics. Co., Ltd., Nanyang (CN)

(72) Inventors: Xiaowei Song, Nanyang (CN); Qinghai Yang, Nanyang (CN); Yingxin Gao, Nanyang (CN); Wei Zhang, Nanyang (CN); Zhaoyang Wu, Nanyang (CN); Minghan Fu, Nanyang (CN); Pan Zhang, Nanyang (CN); Xiaolei Liu, Nanyang (CN)

(73) Assignee: Lucky Huaguang Graphics. Co., Ltd., Nanyang (CN)

( * ) Notice: Subject to any disclaimer, the term of this patent is extended or adjusted under 35 U.S.C. 154(b) by 535 days.

(21) Appl. No.: 18/052,302

(22) Filed: Nov. 3, 2022

(65) Prior Publication Data

US 2023/0331017 A1    Oct. 19, 2023

(30) Foreign Application Priority Data

Apr. 14, 2022  (CN) .......................... 202210391192.8
Apr. 23, 2022  (CN) .......................... 202210432509.8

(51) Int. Cl.
*B41M 5/333* (2006.01)
*B41M 1/28* (2006.01)
*B41M 5/26* (2006.01)
*B41M 5/337* (2006.01)

(52) U.S. Cl.
CPC ............ *B41M 5/3331* (2013.01); *B41M 1/28* (2013.01); *B41M 5/262* (2013.01); *B41M 5/3377* (2013.01)

(58) Field of Classification Search
CPC ....................................................... B41M 5/26
See application file for complete search history.

(56) References Cited

U.S. PATENT DOCUMENTS

| | | | |
|---|---|---|---|
| 4,004,924 A | | 1/1977 | Vrancken et al. |
| 6,558,871 B1 * | | 5/2003 | Takahashi .............. C08G 59/68 |
| | | | 570/101 |
| 6,899,994 B2 * | | 5/2005 | Huang .................. B41C 1/1008 |
| | | | 430/905 |
| 7,153,632 B1 | | 12/2006 | Saraiya et al. |
| 7,332,253 B1 | | 2/2008 | Tao et al. |
| 2017/0217149 A1 * | | 8/2017 | Hayashi ................ B41C 1/1008 |

FOREIGN PATENT DOCUMENTS

| | | |
|---|---|---|
| EP | 0980754 | 2/2000 |
| EP | 1859936 | 11/2007 |
| WO | 94/23954 | 10/1994 |
| WO | 2013/032780 | 3/2013 |

\* cited by examiner

*Primary Examiner* — Robert A Vetere
(74) *Attorney, Agent, or Firm* — HSML P.C.

(57) ABSTRACT

Iodonium salt initiator and processing-free thermally sensitive plate precursor containing thereof, and processing-free thermally sensitive plate and use thereof, At least one of two para positions of two benzene rings of the iodonium salt initiator is an alkene group containing a carbon or nitrogen or oxygen atom and a double bond at an end. The alkene group can increase a steric hindrance of the iodonium salt, improves compatibility of the iodonium salt, the thermosensitive resin and the crosslinkable prepolymer, reduces the surface migration of the iodonium salt in the imaging layer and improves the initiation efficiency. During the laser imaging, a double bond contained in a residual end of the iodonium salt can perform a crosslinking reaction with the thermosensitive resin and the crosslinkable prepolymer, and thus reduces damage to the imaging layer caused by small molecules. At the same time, substituents can be arranged at four meta positions of the two benzene rings to increase the steric hindrance of the iodonium salt, and therefore, the surface migration of the iodonium salt in the imaging layer is further reduced, and the initiation efficiency is improved and the performance of the processing-free thermally sensitive plate is further improved.

11 Claims, No Drawings

IODONIUM SALT INITIATOR AND PROCESSING-FREE THERMALLY SENSITIVE PLATE PRECURSOR CONTAINING THEREOF, AND PROCESSING-FREE THERMALLY SENSITIVE PLATE AND USE THEREOF

FIELD OF TECHNOLOGY

The present disclosure belongs to the technical field of lithography and particularly relates to an iodonium salt initiator and a processing-free thermally sensitive plate precursor containing thereof, and a processing-free thermally sensitive plate and use thereof.

BACKGROUND

Computer-to-plate (CTP) is widely used in modern printing. Common CTP plates are divided into a photosensitive CTP plate and a thermally sensitive CTP plate.

The thermally sensitive CTP plate (thermally sensitive plate) is an offset plate using infrared laser for imaging. The thermally sensitive plate is widely used since it can be operated in a bright room and has high imaging quality.

The printing industry is not environment-friendly, and is highly pollutive. Particularly, a waste developing solution generated in a printing process causes great damage to the environment. Therefore, a green printing technology has been advocated in the printing industry throughout the world. The green printing technology refers to using environment-friendly materials and process technologies, and reducing pollution generated in the printing process. Developing green and environment-friendly printing plates is important for green printing.

The thermally sensitive plate technology is continuously advanced and developed, and the thermally sensitive plate is updated. Exploring the green printing technology and developing an environment-friendly processing-free thermally sensitive plate are development directions.

Technical routes of the processing-free thermally sensitive plate can be divided into a thermal ablation technology, a phase change technology, a hot melting technology and the like. The thermal ablation technology means that an oleophylic coating is ablated by infrared laser energy and a hydrophilic area is formed on an exposed hydrophilic surface of an aluminum plate. The phase change technology means that laser energy enables a polymer to generate a hydrophilic-lipophilic conversion and thus realizes separation of ink and water. The hot melting technology means that a laser energy melts thermoplastic polymer particles dispersed in a cross-linked hydrophilic layer and thus enables the thermoplastic polymer to turn from being hydrophilic to hydrophobic and oleophilic.

The processing-free thermally sensitive plate can be divided into two main categories: (1) a direct-loading processing-free thermally sensitive plate; and the plate can be directly loaded after imaging, developed under an action of a fountain solution of a printing press, and used for printing; and (2) a low-chemical developing-type processing-free thermally sensitive plate; and after the plate is exposed and imaged on a plate maker, the plate can be developed by washing with clean water instead of a chemical developing solution and loaded for printing.

Developing the processing-free thermally sensitive plate, especially a processing-free thermally sensitive plate precursor, is a hot spot in the world today. The processing-free thermally sensitive plate precursor refers to a precursor for manufacturing the processing-free thermally sensitive plate, generally necessary materials and technologies required before manufacturing the processing-free thermally sensitive plate.

The technologies for developing the processing-free thermally sensitive plate precursor have been disclosed as follows: WO2013/032780 discloses a lithographic printing plate precursors for on-press development: EP0980754 describes a decarboxylation technology to achieve a hydrophilic-hydrophobic conversion: WO94/23954 describes a microcapsuled heat-fusible technology: U.S. Pat. No. 4,004,924 describes a mixture of a thermoplastic hydrophobic particle and a hydrophilic binder: EP 2006 May 24 06114475.4 describes a heat-fusible thermoplastic granule: 2005 Aug. 3 U.S. Ser. No. 11/196,124 describes a one-dimensional linear structural hydrophilic adhesive; and 2006 Jul. 27 U.S. Ser. No. 11/494,235 describes a printing plate precursor containing a hydrophilic group and an esterified allyl group.

At present, the processing-free thermally sensitive plate is subjected to a plurality of technologies, wherein one mainstream technology is that heat of a laser is used to act on an initiator and the initiator triggers a thermally sensitive layer to generate a chemical reaction so as to realize laser imaging. An onium salt initiator is widely used in a laser imaging system of the processing-free thermally sensitive plate.

In the process of continuously developing and improving technologies for the processing-free thermally sensitive plate, it is found that when the onium salt initiator is used in the laser imaging system of the processing-free thermally sensitive plate, the following problems are urgently needed to be solved: 1. the onium salt initiator migrates on a surface of an imaging layer, which directly affects the initiation efficiency, and leads to insufficient deep initiation, unreal reduction of dots of images and insecure coating and the like; and 2. small molecules generated by the onium salt initiator after a laser decomposition damage the imaging layer. The above problems are particularly apparent in the processing-free thermally sensitive plate containing a discrete particle in the imaging layer.

The present disclosure aims to solves the problems of surface migration and residue of the onium salt initiator in the imaging layer, improve the initiation efficiency and further improve a performance of the processing-free thermally sensitive plate.

SUMMARY

In order to solve the above problems, the present disclosure provides an iodonium salt initiator and a processing-free thermally sensitive plate precursor containing thereof, and a processing-free thermally sensitive plate and use thereof. At least one of two para positions of two benzene rings of the iodonium salt initiator is an alkene group containing a carbon or nitrogen or oxygen atom and a double bond at an end. The alkene group can increase a steric hindrance of an iodonium salt, meanwhile can participate in a cross-linking reaction of an imaging layer during a laser imaging, and thus reduces damage to the imaging layer by small molecules generated during decomposition of the iodonium salt. The iodonium salt initiator can effectively solve the problems of surface migration and residue of the onium salt initiator in the imaging layer, and improve a performance of the processing-free thermally sensitive plate, especially that containing a discrete particle.

The objective of the present disclosure is achieved by using the following method.

The iodonium salt initiator of the present disclosure is a cation initiator, specifically a macromolecular iodonium salt containing a double bond, and has the following structure:

structural formula 1

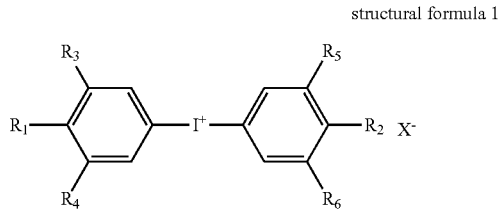

wherein, $R_1$ and $R_2$ are H or a $C_{1-12}$ alkyl group, or an alkene group containing a carbon or oxygen or nitrogen atom and a double bond at an end, at least one of $R_1$ and $R_2$ is an alkene group containing a carbon or nitrogen or oxygen atom and a double bond at an end;

$R_3$, $R_4$, $R_5$, and $R^6$ are independently H or a $C_{1-12}$ alkyl group; and $X^-$ is an acid anion, preferably, a hexafluorophosphate anion, a hexafluoroantimonate anion or a tetrafluoroborate anion.

A processing-free thermally sensitive plate precursor comprises a carrier and an imaging layer, the imaging layer comprises a hydrophilic thermosensitive resin, a crosslinkable prepolymer, a thermal initiator and an infrared absorber, and the thermal initiator is the iodonium salt initiator of the above-mentioned structure provided by the present application.

The iodonium salt initiator provided by the present disclosure is a macromolecular iodonium salt containing a double bond. At least one of two para positions of two benzene rings of the iodonium salt initiator is an alkene group containing a carbon or nitrogen or oxygen atom and a double bond at an end. The alkene group can increase a steric hindrance of the iodonium salt, improves compatibility of the iodonium salt, the thermosensitive resin and the crosslinkable prepolymer, reduces the surface migration of the iodonium salt in the imaging layer and improves the initiation efficiency. During the laser imaging, a double bond contained in a residual end of the iodonium salt can perform a crosslinking reaction with the thermosensitive resin and the crosslinkable prepolymer, and thus reduces damage to the imaging layer caused by small molecules. At the same time, substituents can be arranged at four meta positions of the two benzene rings to increase the steric hindrance of the iodonium salt, and therefore, the surface migration of the iodonium salt in the imaging layer is further reduced, and the initiation efficiency is improved and the performance of the processing-free thermally sensitive plate is further improved.

DESCRIPTION OF THE EMBODIMENTS

The iodonium salt initiator of the present disclosure is a cation initiator, specifically a macromolecular iodonium salt containing a double bond, and has the following structure:

structural formula 1

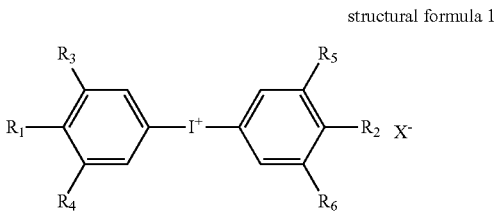

wherein, $R_1$ and $R_2$ are H or a $C_{1-12}$ alkyl group, or an alkene group containing a carbon or oxygen or nitrogen atom and a double bond at an end, at least one of $R_1$ and $R_2$ is an alkene group containing a carbon or nitrogen or oxygen atom and a double bond at an end;

$R_3$, $R_4$, $R_5$, and $R^6$ are independently H or a $C_{1-12}$ alkyl group; and $X^-$ is an acid anion, preferably, a hexafluorophosphate anion, a hexafluoroantimonate anion or a tetrafluoroborate anion.

A processing-free thermally sensitive plate precursor comprises a carrier and an imaging layer, the imaging layer comprises a hydrophilic thermosensitive resin, a crosslinkable prepolymer, a thermal initiator and an infrared absorber, and the thermal initiator is the iodonium salt initiator of the above-mentioned structure provided by the present application.

The iodonium salt initiator with the structure of the present application can be subjected to homolysis and heterolysis under the action of laser heat, and can generate free radicals and electrophilic protonic acid simultaneously, such that the thermosensitive resin and the crosslinkable prepolymer can be subjected to free radical polymerization and cationic polymerization to realize laser imaging.

$X^-$ of the iodonium salt of the present disclosure is an onium salt counter ion which comprises an acid anion such as chloridion and other halide anions, sulfate, p-toluenesulfonate, hexafluorophosphate, hexafluoroantimonate, tetrafluoroarsenate and the like. The onium salt counter ion of the present disclosure is preferably hexafluorophosphate, hexafluoroantimonate and tetrafluoroarsenate.

The macromolecular iodonium salt (code D) with the structure of the present disclosure may be exemplified as follows (but not limited thereto):

D1

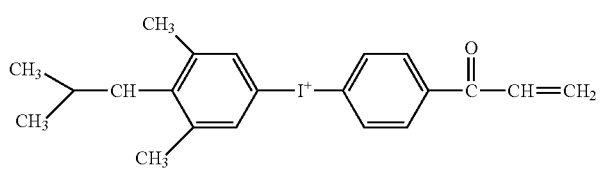

-continued
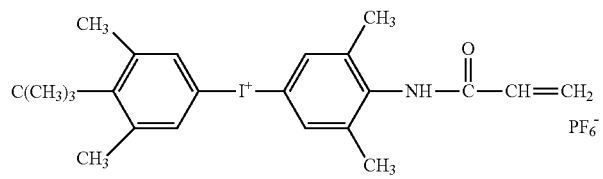 D2
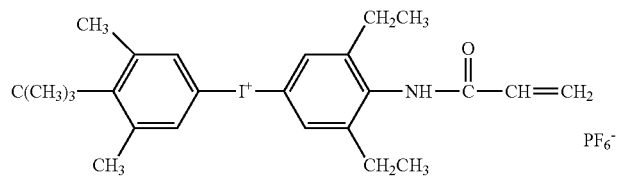 D3
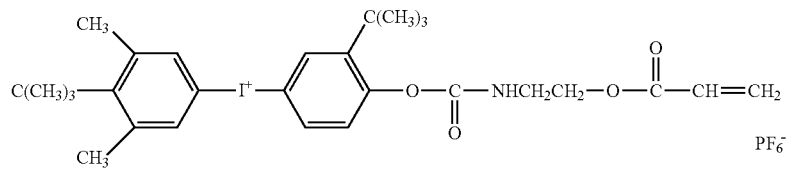 D4
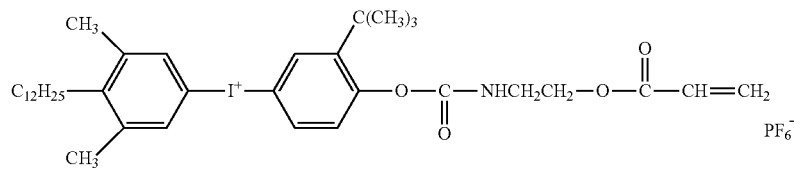 D5
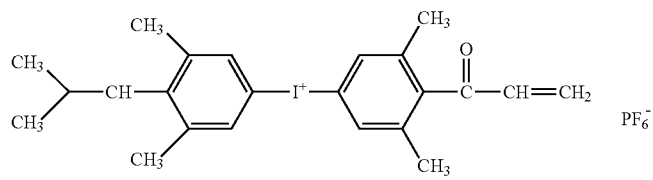 D6
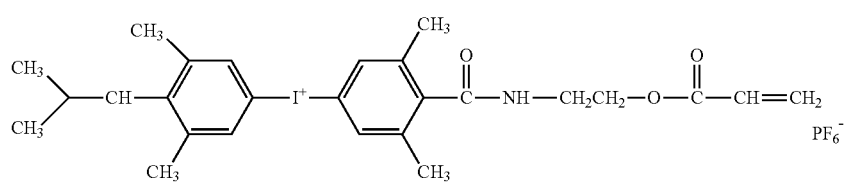 D7
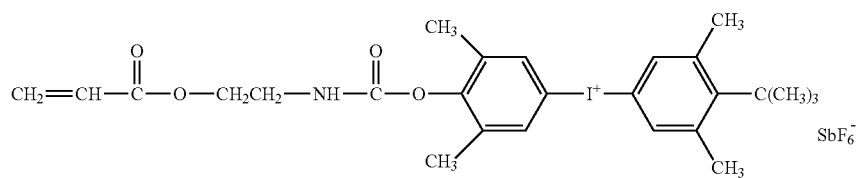 D8
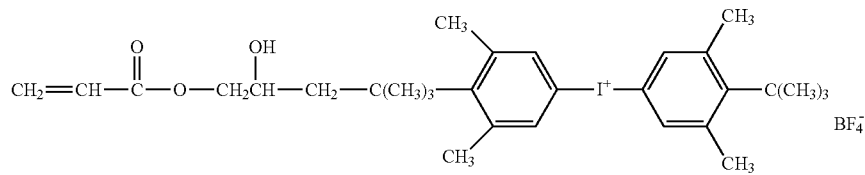 D9

-continued
D10
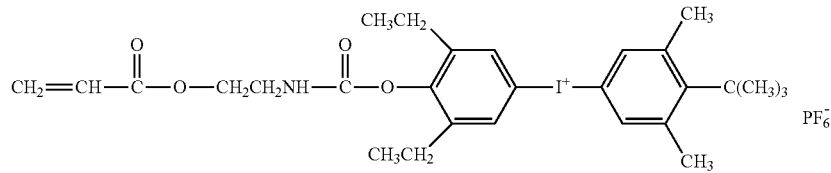
D11
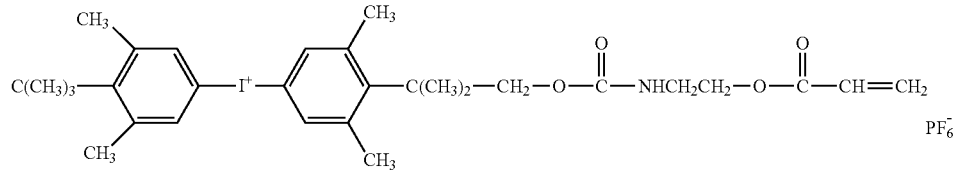
D12
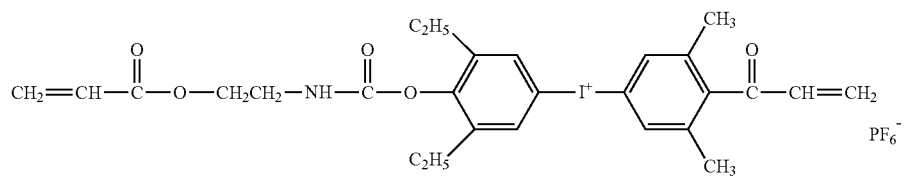
D13
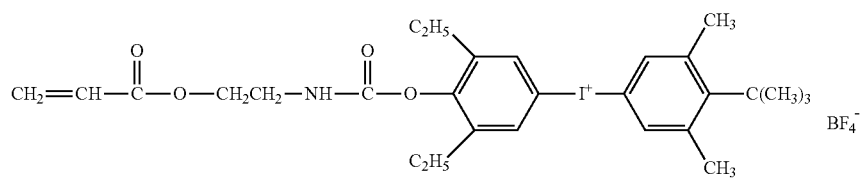
D14
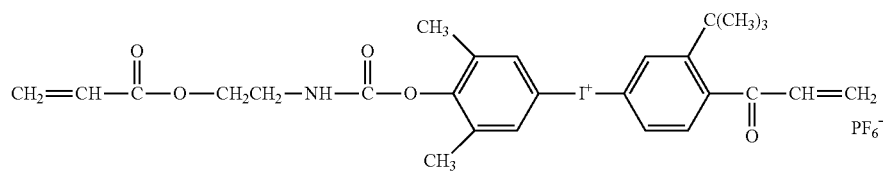
D15
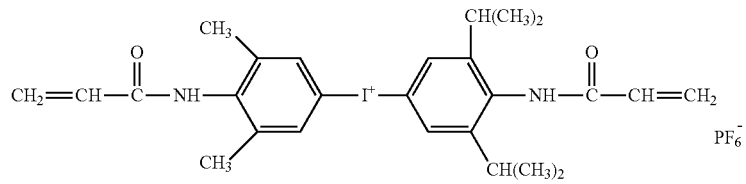
D16
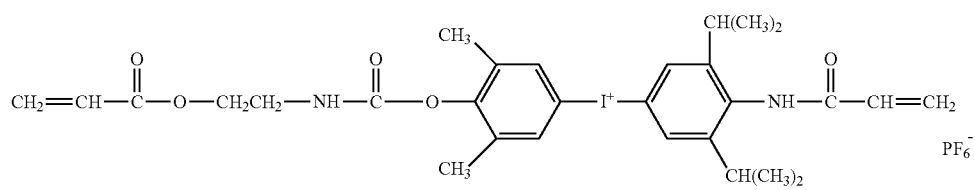
D17
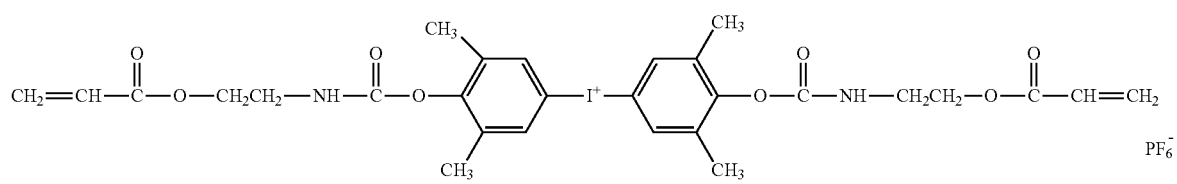

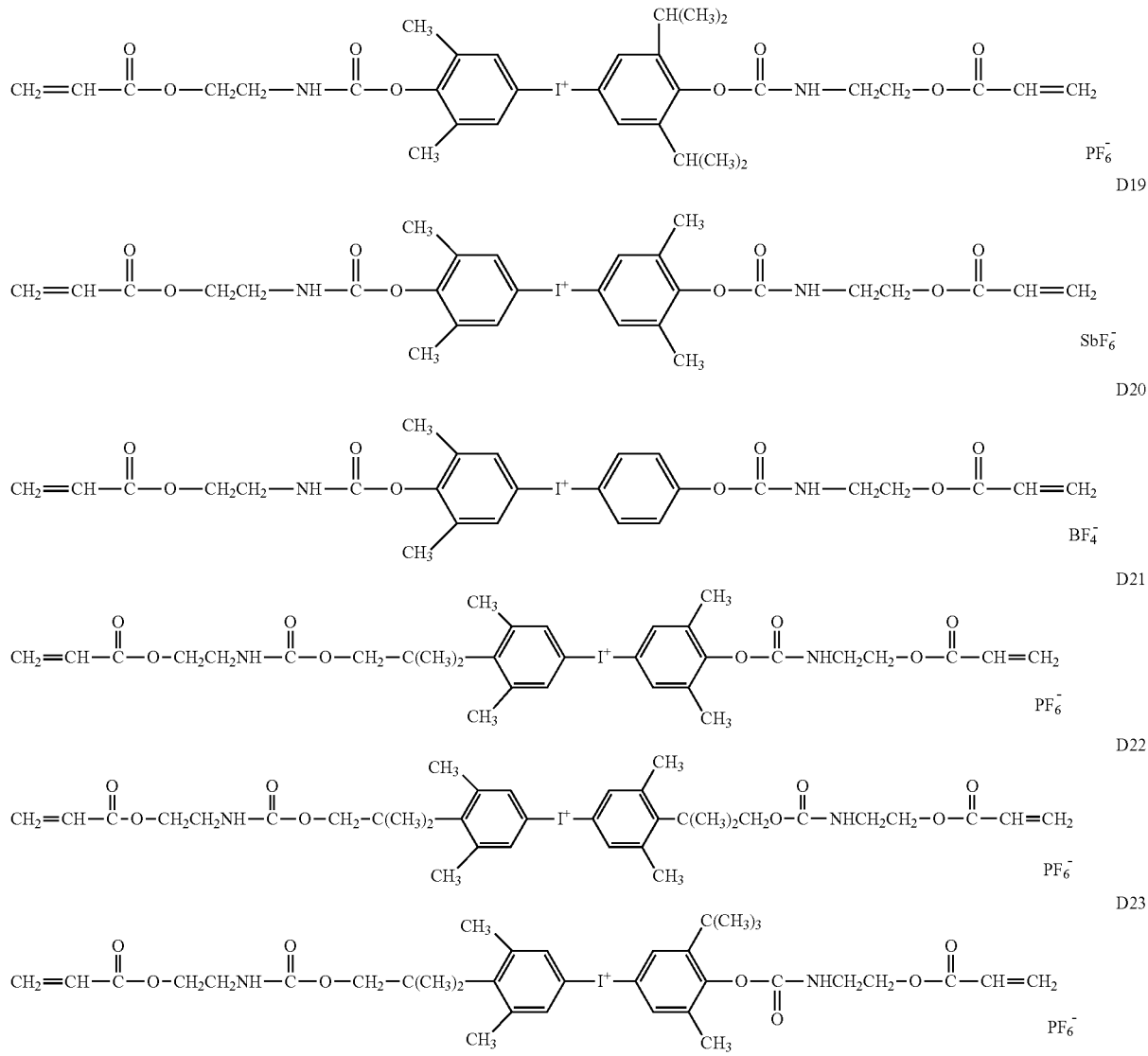

The thermal initiator in the imaging layer accounts for 1-10% of the total solids of the composition in percentage by weight.

The hydrophilic thermosensitive resin in the imaging layer is described as follows:

A macromolecule resin is needed in the imaging layer of the processing-free thermally sensitive plate and particularly, the macromolecule resin is a macromolecule film-forming resin with functional groups. The hydrophilic thermosensitive resin in the imaging layer of the present disclosure is a functional film-forming resin. The macromolecule resin is specially hydrophilic and thermally sensitive in addition to having a film-forming property which can ensure that a film is formed after coating liquid of the imaging layer is dried and the film is attached to a carrier.

The hydrophilic thermosensitive resin in the processing-free thermally sensitive plate precursor is a polyolefin resin with a branched chain containing a hydrophilic group and an epoxy group. Furthermore, the hydrophilic thermosensitive resin in the processing-free thermally sensitive plate precursor of the present disclosure is a polyolefin resin at least containing a polyether acrylate or an acrylamide hydrophilic copolymer unit and an epoxy acrylate copolymer unit on a copolymerized chain.

The hydrophilic thermosensitive resin is a main resin in the imaging layer of the processing-free thermally sensitive plate. Since the resin is hydrophilic, an uncrosslinked part can realize simple pre-cleaning by water or water containing gum during laser imaging, or realize cleaning under the action of a fountain solution during printing to expose a hydrophilic plate base. However, an crosslinked imaging part forms a three-dimensional network structure due to crosslinking of the hydrophilic resin and the prepolymer after a laser thermal action, such that polarity and solubility of the resin are changed, and the resin is changed from hydrophilic to hydrophobic. A best way to achieve water solubility of the resin is to directly select a vinyl monomer having a pendant hydrophilic group as a copolymer unit of the resin. The pendant hydrophilic group is a carboxyl group, a hydroxyl group, a phosphate group, a sulfonic group, an amino group, an amide group, an ether group and the like. The hydrophilic thermosensitive resin of the present disclosure uses a branched polyether or an acylamino as a hydrophilic group, namely the hydrophilic thermosensitive resin at least contains a polyether acrylate or an acrylamide hydrophilic copolymer unit on a copolymerized chain. The polyether acrylate or acrylamide hydrophilic copolymer unit enables the hydrophilic thermosensitive resin to have a good self-emulsibility and to form a nano-micron thermoplastic particle state. Meanwhile, the polyether group and the acrylamide have a good solvent resistance and can resist erosion of monomers in UV ink to the imaging layer.

In addition, as the main resin in the imaging layer of the processing-free thermally sensitive plate, the resin preferably contains a thermosensitive group which contributes to thermosensitive imaging. Such imaging group may be a double bond capable of radical polymerization or an epoxy group capable of cationic polymerization, and the like. The hydrophilic thermosensitive resin contains a group sensitive to heat and the epoxy group capable of cationic polymerization is selected as a photosensitive group, such that a resin structural unit contains an epoxy acrylate copolymer unit, preferably an epoxy acrylic monomer such as glycidyl methacrylate, 3,4-epoxy cyclohexyl methacrylate and the like, further preferably an epoxy acrylic monomer containing a cyclohexyl group, such as 3,4-epoxy cyclohexyl methacrylate. The cyclohexyl group has a better rigidity and the epoxy group on the cyclohexyl group has a very high activity of the cationic polymerization.

Since the resin is the main resin in the imaging layer of the processing-free thermally sensitive plate, comprehensive properties of rigidity, ink affinity and the like of the resin are further needed to be considered. When the resin is in a nano-micron particle state and used as a binder of the chemical processing-free thermally sensitive plate, the resin preferably contains a thermoplastic structural unit, which is favorable for film forming by laser melting. The hydrophilic thermosensitive resin of the present disclosure is preferably a styrene structural unit. As is well known, the styrene structural unit has a good thermoplasticity and a higher glass transition temperature. A styrene copolymer is used as an adhesive of the chemical processing-free thermally sensitive CTP plate, a heated part is easier to melt, molecules are more tightly arranged, a thermal image part is firmer, and a printing resistance of the plate can be increased.

The hydrophilic thermosensitive resin in the imaging layer of the processing-free thermally sensitive plate can be solid, solution or emulsion and the like. Preferably, the hydrophilic thermosensitive resin is a discrete particle. The laser can enable a thermoplastic polymer particle in the discrete state to generate agglutination reaction during the thermosensitive imaging, such that an exposed area is changed from hydrophilic to hydrophobic and oleophilic.

The hydrophilic thermosensitive resin of the present disclosure is synthesized using solution or emulsion copolymerization. Random copolymerization or block copolymerization can be selected in copolymerization reaction, and the random copolymerization is preferred. A polymerization initiator comprises peroxide such as di-t-butyl peroxide, benzoyl peroxide, persulfates such as potassium persulfate and ammonium persulfate, and azo compounds such as azobisisobutyronitrile, etc. The emulsion polymerization is preferred.

A reaction solvent may be selected from water, alcohols, ketones, esters, ethers, etc., or a mixture thereof. The copolymerization reaction is performed preferably at 40-100° C. and most preferably at 60-90° C.

In the processing-free thermally sensitive plate precursor, the hydrophilic thermosensitive resin may be preferably a polyolefin resin obtained by copolymerization of styrene, polyethylene glycol acrylate (molecular weight of 2,000), isopropylacrylamide, and 3,4-epoxy cyclohexyl methacrylate; and based on weight percentage, in a copolymer unit of the hydrophilic thermosensitive resin, the styrene accounts for 30-70%, the poly(ethylene glycol) methyl ether methacrylate (number-average molecular weight Mn=2,000) accounts for 5-20%, the isopropylacrylamide accounts for 5-20%, and the 3,4-epoxycyclohexyl methacrylate accounts for 10-30%. The hydrophilic thermosensitive resin is a discrete particle with a particle diameter of 50-200 nm.

The hydrophilic thermosensitive resin in the imaging layer accounts for 40-80% of the total solids of the composition in percentage by weight.

The crosslinkable prepolymer in the imaging layer is described as follows:

The crosslinkable prepolymer in the imaging layer may be a monomer capable of radical polymerization or a monomer capable of cationic polymerization, or the like. The monomer capable of radical polymerization is generally an acrylic monomer with a double bond and the monomer capable of cationic polymerization generally contains an epoxy group. The crosslinkable prepolymer in the imaging layer is a polyfunctional acrylic monomer or a polyfunctional polyurethane acrylic monomer, wherein the polyfunctional means that the crosslinkable prepolymer contains a plurality of double bonds. The polyfunctional acrylic monomer is 1,6-hexanediol diacrylate, pentaerythritol triacrylate, pentaerythritol tetraacrylate, dipentaerythritol pentaacrylate, trimethylolpropane triacrylate, hydroxypropyl glyceryl triacrylate, hydroxyethyl trimethylolpropane triacrylate, polyethylene glycol dimethacrylate, dipentaerythritol hexaacrylate, etc. The polyfunctional polyurethane acrylic monomer is a product by condensing isocyanate and polyfunctional acrylate, such as a product by condensing isocyanate, hydroxyethyl acrylate and pentaerythritol triacrylate: or a product by condensing isocyanate containing a double bond such as methacryloxy isocyanate and a polyol compound such as pentaerythritol.

The crosslinkable prepolymer in the imaging layer accounts for 10-50% of the total solids of the composition in percentage by weight.

The infrared absorber in the imaging layer is described as follows:

The infrared absorber in the imaging layer mainly plays a role in energy transfer. Heat energy of an infrared laser is transferred to the thermal initiator through the infrared absorber, and the thermal initiator cracks to generate an active group, such that the hydrophilic thermosensitive resin and the crosslinkable prepolymer are subjected to three-dimensional net polymerization to realize the thermosensitive imaging. The infrared absorber has a maximum absorption wavelength in a range of 750-1,100 nm and is selected from the group consisting of carbon black, azo dyes, triarylamine dyes, indolinium dyes, oxonol dyes, cyanine dyes, merocyanine dyes, indocyanine dyes, phthalocyanine dyes, polythiophene dyes, pyrazoline azo dyes, oxazine dyes, naphthoquinone dyes, anthraquinone dyes, quinoneimine dyes, methine dyes, porphyrin dyes, and the like. In order to improve contrast of plate making, the infrared absorber is favorable for a printing operator to detect image defects of the printing plate by visual testing and is also favorable for a modern highly intelligent printing press to realize an automatic intelligent plate mounting by automatically positioning and identifying cross line images at four corners of the plate. The infrared absorber can be selected from infrared absorbers with a color changing function and a high-contrast image is displayed through laser pyrolysis. The infrared absorber in the imaging layer of the present disclosure is preferably cyanine dyes of 750-850 nm.

The infrared absorber in the imaging layer of the present disclosure accounts for 1-10% of the total solids of the composition in percentage by weight.

The carrier in the processing-free thermally sensitive plate precursor of the present disclosure is described in detail as follows.

The imaging layer of the present disclosure needs to be coated on the carrier and the carrier comprises a metal base such as a steel base, a copper base, an aluminum base, and the like.

The carrier selected in the present disclosure is an aluminum plate base subjected to electrolytic roughening and anodizing treatment.

The aluminum plate base is prepared by the electrolytic roughening and a center line has an average thickness of 0.3-0.6 μm. The aluminum plate base is prepared from more than 99% of aluminum, 0.1%-0.5% of iron, 0.03%-0.3% of silicon, 0.003%-0.03% of copper, and 0.01%-0.1% of titanium. An electrolyte for the electrolytic roughening may be an aqueous solution of acid, base or salt. The aluminum plate is put into 1%-30% of an aqueous solution of sodium hydroxide, potassium hydroxide, sodium carbonate, sodium silicate and the like, and chemically corroded for 5-250 s at a temperature between 2° and 80° C. The aluminum plate is neutralized in 10%-30% of nitric acid or sulfuric acid at 20-70° C. to remove ash. The aluminum plate is electrolyzed at 10-60° C. with a square wave, a platform-type wave or a sine wave of positive and negative alternation at a current density of 5-100 A/dm$^2$ in an electrolyte of nitric acid or hydrochloric acid for 10-300 s. The electrolytically roughened aluminum plate base is subjected to anodizing treatment. The anodizing is usually performed using sulfuric acid at a concentration of 5-30%, a current density of 1-15 A/dm$^2$ and a temperature of 20-60° C. for 5-250 s to form an oxide film of 1-10 g/m$^2$. The anodized aluminum plate base is subjected to hole sealing. Optionally, the aluminum plate base subjected to electrolytic roughening and anodizing treatment may be subjected to hole sealing. The hole sealing can be performed using various methods and preferably, 50-80% by volume of oxide film micropores is sealed. For example, polyvinyl phosphonic acid with a thickness of 3 mg/m$^2$ is coated on the treated aluminum plate to seal the oxide film micropores.

The processing-free thermally sensitive plate precursor of the present disclosure can be used to manufacture the processing-free thermally sensitive plate. A method for manufacturing the processing-free thermally sensitive plate at least comprises the steps of treating the carrier and coating the imaging layer. Optionally, a protective layer may be coated. The protective layer is coated on the imaging layer, reduces polymerization inhibition produced by oxygen to affect performances of the imaging layer and prevents the imaging layer from being polluted by the external environment and scratched. The protective layer can be made of a water-soluble high molecular compound with a relatively good crystallinity, such as water-soluble polymers of polyvinyl alcohol, polyvinylpyrrolidone, hydroxypropyl cellulose, gelatin, gum arabic, polyacrylic acid, etc.

When the processing-free thermally sensitive plate precursor of the present disclosure is used to manufacture the processing-free thermally sensitive plate, other necessary auxiliary agents can also be added, such as a solvent, a normal-temperature heat polymerization inhibitor, a surfactant, a layer coloring agent and the like. The solvent is mainly used for preparing a thermosensitive composition into a thermosensitive coating photosensitive solution and comprises alcohols, ketones, esters, ethers, amides, aromatics, ethylene dichloride, tetrahydrofuran, etc. The solvent may be used in a pure form or as a mixture. The normal temperature thermal polymerization inhibitor is used for preventing the plate from polymerizing at a normal temperature and improving a normal-temperature stability of the plate. The thermal polymerization inhibitor comprises hydroquinone, nitroxide radical piperidinol, p-methoxyphenol, di-t-butyl-p-cresol, pyrogallol, t-butylcatechol, benzoquinone, 4,4'-thiobis-(3-methyl-6-t-butylphenol), 2,2'-methylenebis(4-methyl-16-t-butylphenol), a primary cerium salt of N-nitrosophenylhydroxylamine, etc. The layer coloring agent increases an image density of the thermally sensitive plate after making, and is convenient for visual inspection of the thermally sensitive plate after making or for measurements of the plate by an image analysis measuring device. The layer coloring agent comprises methyl violet, ethyl violet, crystal violet, Victoria blue, glossy dark green, oil blue, oil yellow; rhodamine B, methyl violet, malachite green, methylene blue, triazines, and the like. A coating further comprises a surfactant including a nonionic surfactant, an amphoteric surfactant, a silicon-containing surfactant, and a fluorine-containing surfactant, such as betaine, glyceryl stearate, sorbitan palmitate, polysiloxane, and polyfluoroalkyl ether.

The processing-free thermally sensitive plate prepared using the processing-free thermally sensitive plate precursor of the present disclosure is typically coated using techniques known in the art (e.g., knife coating, blade coating, bar coating, roll coating, and press coating).

After the processing-free thermally sensitive plate manufactured by the processing-free thermally sensitive plate precursor of the present disclosure is scanned and exposed by using a thermally sensitive CTP plate maker, the plate is subjected to water washing and developing or directly loaded on a printing press for developing in a fountain solution and printing.

The present disclosure will be specifically described in conjunction with specific examples. It should be understood that the examples are presented only for further illustrating the present disclosure and not intended to limit the scope of protection of the present disclosure. A person skilled in the art can make some non-essential improvements and adjustments according to the content of the present disclosure.

The following are synthesis examples of the present disclosure, but the present disclosure is not limited to the following examples.

Part I: synthesis examples of initiators (D1-D23 were all synthesized by Lucky HuaGuang and basic synthetic routes were as follows).

Main raw materials were obtained from the following companies: sodium borate tetrahydrate, ammonium chloride, potassium iodate, and barium chloride were obtained from J&K Scientific (Shanghai); concentrated sulfuric acid (mass fraction of 98%), acetic acid, acetic anhydride, cyclohexanone, and methanol were obtained from Kaifeng reagent limited company: 4-N(allyl)-3,5-diisopropyliodobenzene and 3,5-dimethyl-4-tert-butyl-p-iodobenzene were obtained from Shenyang Research Institute of chemical industry: N-(ethylacrylate)-2,6-dimethyl-benzoic acid, (hydroxypropyl methacrylate-substituted) isopropyl-2,6-dimethyl benzene and N-(acryloyloxy)-2,6-dimethyl benzene were obtained from Lucky HuaGuang; potassium hexafluorophosphate, potassium tetrafluoroborate, and potassium hexafluoroantimonate were obtained from Tianjin Bodi Chemical Co., Ltd.; and diethyl ether and petroleum ether were obtained from Tianjin No. 2 Chemical Reagent Factory.

Examples of Synthesis of Asymmetric Macromolecular Iodonium Salts:

Synthesis of Iodonium Salt D13:

23 g of sodium borate tetrahydrate, 40 g of acetic acid and 60 g of acetic anhydride were added into a 500-ml four-neck flask with a device for temperature-controlled heating, mechanical stirring, condensation reflux, and nitrogen protection, the materials were stirred at 30° C. for 1.5 h, 58.2 g of 3,5-dimethyl-4-tert-butyl-p-iodobenzene was added, the materials were stirred at 40° C. for 1.5 h and cooled to 0° C., 43.4 g of N-(ethylacrylate)-2,6-dimethyl-benzoic acid was added, a temperature was controlled to be below 5° C., a mixed solution of 30 ml of concentrated sulfuric acid and 30 ml of acetic acid was dropwise added, the materials were heated to 15° C. and stirred for 24 h, reaction liquid was poured into ice water to be stirred for 0.5 h and extracted for 3 times by using petroleum ether, 1,000 ml of an ammonium chloride aqueous solution with a mass fraction of 20% was slowly dropwise added into an aqueous phase, a solid was precipitated, filtering, washing by using deionized water, and drying in vacuum were performed, the obtained solid was dissolved in methanol, 30 g of potassium fluoborate was added to react for 2 h, reaction liquid was dropped into 1,000 ml of deionized water, filtering was performed, and a precipitated solid was collected, washed with deionized water, and dried in vacuum to obtain target product D13.

Synthesis of Iodonium Salt D16:

23 g of sodium borate tetrahydrate, 40 g of acetic acid and 60 g of acetic anhydride were added into a 500-ml four-neck flask with a device for temperature-controlled heating, mechanical stirring, condensation reflux, and nitrogen protection, the materials were stirred at 30° C. for 1.5 h, 43.4 g of 4-N(allyl)-3,5-diisopropyliodobenzene was added, the materials were stirred at 40° C. for 1.5 h and cooled to 0° C., 53 g of N-(ethylacrylate)-2,6-dimethyl-benzoic acid was added, a temperature was controlled to be below 5° C., a mixed solution of 30 ml of concentrated sulfuric acid and 30 ml of acetic acid was dropwise added, the materials were heated to 15° C. and stirred for 24 h, reaction liquid was poured into ice water to be stirred for 0.5 h and extracted for 3 times by using petroleum ether, 1,000 ml of an ammonium chloride aqueous solution with a mass fraction of 20% was slowly dropwise added into an aqueous phase, a solid was precipitated, filtering, washing by using deionized water, and drying in vacuum were performed, the obtained solid was dissolved in methanol, 400 ml of a potassium hexafluorophosphate aqueous solution with a mass fraction of 10% was slowly dropped, filtering was performed, and a precipitated solid was collected, washed with deionized water, and dried in vacuum to obtain target product D16.

Examples of Synthesis of Symmetric Macromolecular Iodonium Salts:

Synthesis of Iodonium Salt D17:

47.1 g of potassium iodate, 78 g of N-(ethylacrylate)-2,6-dimethyl-benzoic acid, 200 ml of glacial acetic acid, and 100 ml of acetic anhydride were added into a 500-ml four-neck flask with a device for temperature-controlled heating, mechanical stirring, condensation reflux, and nitrogen protection, the materials were stirred in an ice-water bath, a mixture of 40 ml of concentrated sulfuric acid and 60 ml of acetic acid was slowly dropwise added and reacted for 6 h, the materials were heated to 15° C. and stirred for 24 h, an insoluble substance was filtered, a mixture of 500 g of ether and 500 g of water was added, an aqueous phase was taken and extracted 2 times with 200 ml of ether, an aqueous phase was taken and diluted to 1,000 ml by adding deionized water, 400 ml of a potassium hexafluorophosphate aqueous solution with a mass fraction of 10% was slowly dropwise added, filtering was performed, and a precipitated solid was collected, washed 2 times alternately with deionized water and ether, and dried in vacuum to obtain target product D17.

Synthesis of iodonium salt D19:

47.1 g of potassium iodate, 78 g of 2,6-dimethyl-N-(ethylacrylate)-benzoic acid, 21 g of barium chloride, 200 ml of glacial acetic acid, and 100 ml of acetic anhydride were added into a 1,000-ml four-neck flask with a device for temperature-controlled heating, mechanical stirring, condensation reflux, and nitrogen protection, the materials were stirred in an ice-water bath, a mixture of 40 ml of concentrated sulfuric acid and 60 ml of acetic acid was slowly dropwise added and reacted for 6 h, the materials were heated to 15° C. and stirred for 24 h, an insoluble substance was filtered, 200 ml of cyclohexanone and 40 g of potassium hexafluoroantimonate were added, the materials reacted for 2 h, reaction liquid was dropped into 1,000 ml of deionized water, filtering was performed, and a precipitated solid was collected, washed 2 times with deionized water, and dried in vacuum to obtain target product D19.

Referring to the basic synthetic routes, macromolecular iodonium salts D1-D23 were synthesized.

Part II: Synthesis Examples of Hydrophilic Thermosensitive Resin (No. A1-A22).

Main raw materials were obtained from the following companies: styrene (St), isopropylacrylamide (IPAM), and isopropyl alcohol were obtained from J&K Scientific (Shanghai): poly(ethylene glycol) methyl ether methacrylate (PEGMA) (number-average molecular weight Mn=2,000) was obtained from Merck Sigma-Adrich: 3,4-epoxycyclohexyl methacrylate (CMA) was obtained from Mitsubishi Rayon; methyl ethyl ketone (MEK) was obtained from: Lanzhou Petrochemical Company; and azobisisobutyronitrile (AIBN) was obtained from Fuchen (Tianjin) Chemical Reagent Co., Ltd.

Hydrophilic thermosensitive resin A1: 75 g of deionized water and 250 g of isopropanol were added into a 500-ml four-neck flask with a device for temperature-controlled heating, mechanical stirring, condensation reflux, and nitrogen protection, the materials were heated to 80° C., the following mixture was dropwise added: 30 g (30 wt %) of styrene (St), 20 g (20 wt %) of poly(ethylene glycol) methyl ether methacrylate (PEGMA) (number-average molecular weight Mn=2,000), 20 g of (20 wt %) of isopropylacrylamide (IPAM), 30 g (30 wt %) of 3,4-epoxycyclohexyl methacrylate and 1 g of azobisisobutyronitrile were dropwise added for 60 min, the materials reacted at 80° C. for 8 h, 0.51 g of azobisisobutyronitrile was supplemented, the materials continuously reacted for 8 h, a temperature was lowered to stop the reaction, and a particle size was measured to be 50 nm. A reaction stock solution was used directly according to the solid content.

According to ratios of copolymer units given in Table 1 with reference to a synthesis process of the hydrophilic thermosensitive resin A1, the amount of water and alcohol and dropping time were adjusted, the hydrophilic thermosensitive resins A1-A22 with different ratios of copolymer units and particle sizes were synthesized, and the particle sizes were shown in Table 1.

Comparative examples of synthesis of hydrophilic thermosensitive resin of the present disclosure:

According to an introduction of AGFA's patent EP 2006 May 24 06114475.4, AGFA polymer F was synthesized. The polymer did not contain a hydrophilic group and had the following structure:

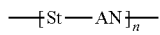

Basic operation: 75 g of deionized water, 250 g of isopropanol, and 5 g of sodium lauryl sulfate were added into a 1,000-ml four-neck flask with a device for temperature-controlled heating, mechanical stirring, condensation reflux, and nitrogen protection, 60 g (60 wt %) of styrene (St), 40 g (40 wt %) of acrylonitrile (AN), 0.7 g of azobisisobutyronitrile (AIBN) were dropwise added at 80° C. for 0.5 h, the materials reacted for 7.5 h, 0.3 g of azobisisobutyronitrile (AIBN) was added, and the materials continuously reacted for 12 h before the reaction was stopped.

According to Kodak's patent US 2005 Aug. 3 11/196, Kodak polymer K was synthesized. The polymer contains a polyether hydrophilic group, but did not contain an epoxy group, and had the following structure:

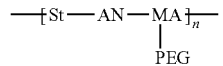

Basic operation: 75 g of deionized water and 250 g of n-propanol were added into a 1,000-ml four-neck flask with a device for temperature-controlled heating, mechanical stirring, condensation reflux, and nitrogen protection, 20 g (20 wt %) of styrene (St), 70 g (70 wt %) of acrylonitrile (AN), 10 g (10 wt %) of poly(ethylene glycol) methyl ether methacrylate (PEGMA), and azobisisobutyronitrile (AIBN) were dropwise added at 80° C. for 0.5 h, the materials reacted for 7.5 h, 0.3 g of azobisisobutyronitrile (AIBN) was added, and the materials continuously reacted for 12 h before the reaction was stopped.

Example 1

Preparation of plate base: A1050 rolled aluminum plate with a purity of 99.5% and a thickness of 0.3 mm was eroded in a sodium hydroxide aqueous solution with a mass fraction of 5% at 70° C. for 20 s, rinsed with running water, and immediately neutralized with a nitric acid aqueous solution with a mass fraction of 1%. The aluminum plate was electrolytically roughened in a hydrochloric acid aqueous solution with a mass fraction of 1% at 40° C. with a sine-wave alternating current at a current density of 50 A/dm$^2$ for 16 s, neutralized with a sodium hydroxide aqueous solution with a mass fraction of 5% at 40° C. for 10 s, and washed with water. The aluminum plate was anodized at 30° C. for 20 s with a sulfuric acid aqueous solution with a mass fraction of 20% at a current density of 15 A/dm$^2$ and washed with water. The aluminum plate was subjected to hole sealing at 80° C. for 18 s with a sodium silicate aqueous solution with a mass fraction of 5%. In the obtained plate base, a center line has an average thickness of 0.5 μm and an oxide film has a density of 3.0 g/dm$^2$.

Raw materials of imaging layer: an infrared absorber meeting requirements of the present disclosure can be obtained from Dye Chemical or Merck, and in the example, the infrared absorber (IR820) was Merck's product Sigma-Adrich 543365 and had a chemical name: 2-[2-[2-chloro-3-[[1,3-dihydro-1,1-dimethyl-3-(4-sulfobutyl)-2H-benzo[e]indole-2-ylidene]-ethylidene]-1-cyclohexen-1-yl]-vinyl]-1,1-dimethyl-3-(4-sulfobutyl)-1H-benzo[e]indolinium hydroxide inner salt: multifunctional acrylate: SR399 was dipentaerythritol pentaacrylate obtained from Sartomer: multifunctional polyurethane acrylate: PU100 was polyurethane acrylate and a polycondensate of Covestro Desmodurn100, hydroxyethyl acrylate, and pentaerythritol triacrylate, and obtained from Shenyang Research Institute of chemical industry: surfactant BYK306 was obtained from BYK company: 1-methoxy-2-propanol was obtained from United Carbide; polyvinyl alcohol PVA-205 was obtained from Kuraray Co., Ltd., Japan: polyvinylpyrrolidone PVPK30 was obtained from BASF, Germany; and emulsifier OP-10 was obtained from Helm, Germany.

Raw materials of imaging layer (specific raw materials and amount were shown in Table 2):
Hydrophilic thermosensitive resin
Crosslinkable prepolymer
Thermal initiator
Infrared absorber (IR820)

0.5 g of surfactant BYK306 was added to the raw materials, 700 g of 1-methoxy-2-propanol was prepared into coating liquid of an imaging layer, the coating liquid of an imaging layer was squeeze-coated on the hydrophilized plate base, and drying was performed at 100° C. for 60 s. An obtained coating layer had a dry weight of 15 mg/dm$^2$.

A following protective layer was squeeze-coated on the imaging layer and dried at 110° C. for 60 s. An obtained coating layer had a dry weight of 10 mg/dm$^2$.

| Formula of protective layer: | |
|---|---|
| Polyvinyl alcohol PVA-205 (Kuraray, Japan) | 17 g |
| Polyvinylpyrrolidone PVPK30 (BASF, Germany) | 3 g |
| Emulsifier OP-10 (Helm, Germany) | 0.45 g |
| Deionized water | 480 g |

Different thermally sensitive plates were prepared by using the same process: necessary additives such as the plate base, the protective layer, the solvent, etc. were unchanged, the formula of the imaging layer was changed according to data given in Table 2 to manufacture the thermally sensitive plates in examples 1-22 and comparative examples 1-12, and properties of the thermally sensitive plates were listed in Table 3 below.

Test analysis of plate:
Initial: refers to the time when the plate was just manufactured.
Forced aging refers to simulate a state of natural storage in a forced manner.
1. Initial sensitivity: sensitivity is characterized by a laser energy value required during imaging: if initiation efficiency of the just manufactured plate is lower, the energy required by laser imaging is higher; and all the just manufactured plates were exposed in a Kodak ultra-win thermally sensitive CTP plate maker at a step up of 5 mJ/cm$^2$ in an energy range of 80-200 mJ/cm$^2$, the initial sensitivity of the plates was determined according to a PantoneLIVE color numerical workflow, and the properties of the plates were listed in Table 3.
2. Initial dot quality: dot quality is characterized by whether 1-99% of dots can be reduced after laser imaging, for example, 1-99% represents that 1% of dots to 99% of dots can all be reduced, which is the best value, 2-98% represents that only 2-98% of dots can be reduced, 1% and 99% of dots cannot be reduced, which is slightly poor, and so on. If the initiation efficiency of the just manufactured plates is low; there is a higher possibility that 1-100% of dots cannot be completely reduced. All the plates were exposed on the Kodak ultra-win thermally sensitive CTP plate maker with the energy of the best sensitivity, a reduction value of the initial dots of the images was measured according to the PantoneLIVE color numerical workflow; and the properties of the plates were listed in Table 3.

3. Sensitivity after forced aging: forced aging was to simulate a change of thermally sensitive plate within shelf life in natural storage, and all the plates were put into a standard packaging box for a thermally sensitive plate product and forcedly aged for 5 d in an aging box with a temperature of 40° C. and a humidity of 80%. The plates were exposed in a Kodak ultra-win thermally sensitive CTP plate maker at a step up of 5 mJ/cm$^2$ in an energy range of 80-200 mJ/cm$^2$, the sensitivity of the plates was determined according to the PantoneLIVE color numerical workflow; and the properties of the plates were listed in Table 3.

4. Dot quality after forced aging: all the plates were put into a standard packaging box for a thermally sensitive plate product and forcedly aged for 5 d in an aging box with a temperature of 40° C. and a humidity of 80%. The plates were exposed in a Kodak ultra-win thermally sensitive CTP plate maker with the energy of the best sensitivity, a reduction value of the dots of the images was measured according to the PantoneLIVE color numerical workflow; and the properties of the plates were listed in Table 3.

5. Migration rating: all the plates were put into a standard packaging box for a thermally sensitive plate product and forcedly aged for 7 d in an aging box with a temperature of 40° C. and a humidity of 80%. A thermal initiator migrates to surfaces of the plates. Compared with the just manufactured plates, the forcedly aged plates had a different appearance. An X.rite exact scanning spectrophotometer was used to analyze and grade apparent quality of the thermally sensitive plates according to the PantoneLIVE color numerical workflow; and a migration score was obtained. Scoring was performed in a 10-point scale ranging from 1 to 10 points with 10 the worst and 1 point the best.

6. Printing resistance: if the iodonium salt has the low initiation efficiency and the imaging layer is insufficiently cured, the printing resistance of the plates is reduced. In addition, if the iodonium salt generates surface migration in the imaging layer, laser exposure also generates small molecules to break the structure of the imaging layer and also greatly reduces the printing endurance of the plates. The total number of normal printed products by the thermally sensitive plates was tested by using a Heidelberg-XL754C printing press and the properties of the plates were listed in Table 3.

The detection and use results in Table 3 showed that compared with other processing-free plates, the thermally sensitive plate manufactured by the processing-free thermally sensitive plate precursor of the present disclosure had an excellent imaging performance, stability and printing resistance. This is because the thermal initiator in the processing-free thermally sensitive plate precursor of the present disclosure is a macromolecular iodonium salt containing a double bond. At least one of two para positions of two benzene rings of the iodonium salt initiator is an alkene group containing a carbon or nitrogen or oxygen atom and a double bond at an end. The alkene group can increase a steric hindrance of the iodonium salt, improves compatibility of the iodonium salt, the thermosensitive resin and the crosslinkable prepolymer, reduces the surface migration of the iodonium salt in the imaging layer and improves the initiation efficiency. During the laser imaging, a double bond contained in a residual end of the iodonium salt can perform a crosslinking reaction with the thermosensitive resin and the crosslinkable prepolymer, and thus reduces damage to the imaging layer caused by small molecules. At the same time, substituents can be arranged at four meta positions of the two benzene rings to increase the steric hindrance of the iodonium salt, and therefore, the surface migration of the iodonium salt in the imaging layer is reduced, and the initiation efficiency is improved and the performance of the processing-free thermally sensitive plate is improved.

TABLE 1

Weight percentages of raw materials for synthesizing hydrophilic thermosensitive resin and particle size thereof

| Hydrophilic thermosensitive resin | St (%) | PEGMA (%) | IPAM (%) | CMA (%) | Particle size (nm) |
|---|---|---|---|---|---|
| A1 | 30 | 20 | 20 | 30 | 50 |
| A2 | 40 | 15 | 15 | 30 | 106 |
| A3 | 50 | 10 | 10 | 30 | 148 |
| A4 | 60 | 10 | 10 | 20 | 155 |
| A5 | 70 | 10 | 10 | 10 | 148 |
| A6 | 70 | 10 | 5 | 15 | 186 |
| A7 | 70 | 5 | 5 | 20 | 200 |
| A8 | 70 | 5 | 10 | 15 | 172 |
| A9 | 60 | 10 | 20 | 10 | 110 |
| A10 | 60 | 20 | 10 | 10 | 108 |
| A11 | 50 | 15 | 15 | 20 | 115 |
| A12 | 50 | 20 | 10 | 20 | 125 |
| A13 | 40 | 10 | 20 | 30 | 135 |
| A14 | 40 | 20 | 20 | 20 | 65 |
| A15 | 55 | 10 | 20 | 15 | 117 |
| A16 | 55 | 10 | 10 | 25 | 156 |
| A17 | 45 | 15 | 15 | 25 | 112 |
| A18 | 45 | 10 | 15 | 30 | 127 |
| A19 | 65 | 10 | 10 | 15 | 152 |
| A20 | 65 | 15 | 5 | 15 | 136 |
| A21 | 35 | 15 | 20 | 30 | 78 |
| A22 | 35 | 20 | 15 | 30 | 89 |

TABLE 2

Raw materials of imaging layer of plates in examples and comparative examples (unit: g)

| Plate | Hydrophilic thermosensitive resin | Crosslinkable prepolymer | Thermal initiator | Infrared absorber |
|---|---|---|---|---|
| Example 1 | 80 (A5) | 18 (SR399) | 1 (D2) | 1 |
| Example 2 | 80 (A6) | 15 (PU100) | 2.5 (D4) | 2.5 |

TABLE 2-continued

Raw materials of imaging layer of plates in examples and comparative examples (unit: g)

| Plate | Hydrophilic thermosensitive resin | Crosslinkable prepolymer | Thermal initiator | Infrared absorber |
|---|---|---|---|---|
| Example 3 | 80 (A7) | 10 (PU100) | 5 (D13) | 5 |
| Example 4 | 75 (A4) | 10 (SR399) | 7.5 (D22) | 7.5 |
| Example 5 | 75 (A8) | 20 (PU100) | 2.5 (D16) | 2.5 |
| Example 6 | 70 (A9) | 25 (SR399) | 2.5 (D16) | 2.5 |
| Example 7 | 65 (A10) | 25 (SR399) | 5 (D17) | 5 |
| Example 8 | 60 (A11) | 30 (PU100) | 5 (D17) | 5 |
| Example 9 | 55 (A17) | 30 (SR399) | 7.5 (D19) | 7.5 |
| Example 10 | 50 (A20) | 35 (PU100) | 7.5 (D19) | 7.5 |
| Example 11 | 45 (A18) | 40 (SR399) | 10 (D17) | 5 |
| Example 12 | 40 (A19) | 50 (PU100) | 5 (D23) | 5 |
| Example 13 | 70 (A13) | 20 (SR399) | 7 (D19) | 3 |
| Example 14 | 70 (A14) | 20 (PU1009) | 7 (D17) | 3 |
| Example 15 | 70 (A15) | 20 (SR399) | 7 (D17) | 3 |
| Example 16 | 65 (A16) | 25 (PU100) | 7 (D19) | 3 |
| Example 17 | 65 (A12) | 25 (SR399) | 8 (D17) | 2 |
| Example 18 | 65 (A2) | 25 (PU100) | 8 (D19) | 2 |
| Example 19 | 60 (A1) | 30 (SR399) | 8 (D17) | 2 |
| Example 20 | 30 (A22) | 50 (SR399) | 10 (D16) | 10 |
| Example 21 | 60 (A21) | 30 (PU100) | 7 (D19) | 3 |
| Example 22 | 60 (A3) | 30 (SR399) | 9 (D19) | 1 |
| Comparative example 1 | 80 (A5) | 18 (SR399) | 1 (4,4-didodecylbenzene iodonium hexafluoroantimonate) | 1 |
| Comparative example 2 | 80 (A6) | 15 (PU100) | 2.5 (4,4-di-tert-butyldiphenyl iodonium hexafluorophosphate) | 2.5 |
| Comparative example 3 | 80 (A7) | 10 (PU100) | 5 (diphenyliodonium hexafluorophosphate) | 5 |
| Comparative example 4 | 75 (A7) | 10 (PU100) | 7.5 (4,4-didodecylbenzene iodonium hexafluorophosphate) | 7.5 |
| Comparative example 5 | 75 (A8) | 20 (PU100) | 2.5 (4,4-didodecylbenzene iodonium hexafluoroantimonate) | 2.5 |
| Comparative example 6 | 70 (A9) | 25 (SR399) | 2.5 (diphenyliodonium tetrafluoroborate) | 2.5 |
| Comparative example 7 | 65 (A10) | 25 (SR399) | 5 (4,4-dimethyldiphenyliodonium hexafluorophosphate) | 5 |
| Comparative example 8 | 60 (A11) | 30 (PU100) | 5 (4,4-didodecylbenzene iodonium hexafluoroantimonate) | 5 |
| Comparative example 9 | 50 (A20) | 35 (PU100) | 7.5 (4,4-didodecylbenzene iodonium hexafluorophosphate) | 7.5 |
| Comparative example 10 | 60 (A1) | 30 (SR399) | 8 (4,4-didodecylbenzene iodonium hexafluoroantimonate) | 2 |
| Comparative example 11 | 30 (A22) | 50 (SR399) | 10 (4,4-didodecylbenzene iodonium hexafluorophosphate) | 10 |
| Comparative example 12 | 80 (F) | 10 (SR399) | 5 (diphenyliodonium hexafluorophosphate) | 5 |
| Comparative example 13 | 40 (F) | 40 (SR399) | 10 (4,4-di-tert-butyldiphenyl iodonium hexafluorophosphate) | 10 |
| Comparative example 14 | 70 (F) | 20 (SR399) | 5 (4,4-didodecy lbenzene iodonium hexafluoroantimonate) | 5 |
| Comparative example 15 | 60 (F) | 30 (SR399) | 5 (diphenyliodonium tetrafluoroborate) | 5 |
| Comparative example 16 | 50 (F) | 35 (SR399) | 5 (4,4-dimethyldiphenyliodonium hexafluorophosphate) | 10 |
| Comparative example 17 | 40 (F) | 50 (PU100) | 1 (diphenyliodonium hexafluorophosphate) | 9 |
| Comparative example 18 | 80 (K) | 10 (SR399) | 5 (diphenyliodonium hexafluorophosphate) | 5 |
| Comparative example 19 | 60 (K) | 30 (SR399) | 3 (4,4-dimethyldiphenyliodonium hexafluorophosphate) | 7 |
| Comparative example 20 | 40 (K) | 50 (SR399) | 2 (4,4-didodecylbenzene iodonium hexafluoroantimonate) | 8 |

TABLE 2-continued

Raw materials of imaging layer of plates in examples and comparative examples (unit: g)

| Plate | Hydrophilic thermosensitive resin | Crosslinkable prepolymer | Thermal initiator | Infrared absorber |
|---|---|---|---|---|
| Comparative example 21 | 70 (K) | 20 (SR399) | 2 (diphenyliodonium tetrafluoroborate) | 8 |
| Comparative example 22 | 75 (K) | 15 (PU100) | 5 (diphenyliodonium hexafluorophosphate) | 5 |

TABLE 3

Use performance of plates

| Plate | Initial sensitivity (mj/cm$^2$) | Initial dot quality (1-100%) | Sensitivity after forced aging (mj/cm$^2$) | Dot quality after forced aging (1-100%) | Migration score (1-10) | Printing resistance (Ten thousand prints) |
|---|---|---|---|---|---|---|
| Example 1 | 115 | 1-99 | 125 | 1-98 | 5 | 11.3 |
| Example 2 | 115 | 1-99 | 125 | 2-99 | 4 | 12.3 |
| Example 3 | 115 | 1-99 | 120 | 2-99 | 3 | 145 |
| Example 4 | 110 | 1-99 | 115 | 1-99 | 2 | 13.4 |
| Example 5 | 110 | 1-99 | 115 | 1-99 | 1 | 13.6 |
| Example 6 | 110 | 1-99 | 120 | 1-99 | 1 | 14.6 |
| Example 7 | 115 | 1-99 | 120 | 1-99 | 1 | 13.7 |
| Example 8 | 110 | 1-99 | 120 | 1-99 | 1 | 15.4 |
| Example 9 | 110 | 1-99 | 115 | 1-99 | 2 | 14.2 |
| Example 10 | 110 | 1-99 | 120 | 1-99 | 2 | 13.6 |
| Example 11 | 110 | 1-99 | 115 | 1-99 | 1 | 15.1 |
| Example 12 | 115 | 1-99 | 120 | 1-99 | 1 | 13.9 |
| Example 13 | 110 | 1-99 | 115 | 1-99 | 1 | 13.5 |
| Example 14 | 110 | 1-99 | 125 | 1-99 | 1 | 14.7 |
| Example 15 | 110 | 1-99 | 120 | 1-99 | 1 | 15.3 |
| Example 16 | 110 | 1-99 | 115 | 1-99 | 1 | 13.8 |
| Example 17 | 105 | 1-99 | 110 | 2-99 | 1 | 14.6 |
| Example 18 | 105 | 1-99 | 115 | 1-99 | 1 | 15.1 |
| Example 19 | 105 | 1-99 | 110 | 1-99 | 1 | 14.9 |
| Example 20 | 100 | 1-98 | 105 | 1-98 | 3 | 15.3 |
| Example 21 | 115 | 1-99 | 120 | 1-99 | 1 | 14.7 |
| Example 22 | 105 | 1-99 | 115 | 1-98 | 3 | 14.6 |
| Comparative example 1 | 120 | 2-98 | 140 | 3-97 | 7 | 6.2 |
| Comparative example 2 | 125 | 1-98 | 145 | 2-97 | 9 | 5.7 |
| Comparative example 3 | 120 | 2-99 | 150 | 3-98 | 9 | 7.3 |
| Comparative example 4 | 130 | 2-99 | 145 | 2-97 | 7 | 6.4 |
| Comparative example 5 | 120 | 1-99 | 155 | 3-98 | 8 | 7.3 |
| Comparative example 6 | 130 | 2-98 | 160 | 2-97 | 7 | 5.5 |
| Comparative example 7 | 120 | 2-99 | 140 | 3-98 | 9 | 8.0 |
| Comparative example 8 | 125 | 2-99 | 145 | 2-97 | 7 | 8.1 |
| Comparative example 9 | 120 | 2-99 | 150 | 3-98 | 8 | 7.2 |
| Comparative example 10 | 130 | 2-99 | 160 | 2-98 | 7 | 7.2 |
| Comparative example 11 | 120 | 2-99 | 165 | 3-98 | 7 | 7.1 |
| Comparative example 12 | 120 | 1-98 | 155 | 2-97 | 9 | 8.2 |
| Comparative example 13 | 125 | 1-98 | 140 | 3-97 | 9 | 6.3 |
| Comparative example 14 | 120 | 1-98 | 145 | 2-97 | 9 | 5.7 |
| Comparative example 15 | 120 | 2-99 | 150 | 3-98 | 7 | 7.6 |
| Comparative example 16 | 125 | 1-98 | 145 | 2-97 | 8 | 6.3 |

TABLE 3-continued

| | | | | Dot | | Printing |
| | | | Sensitivity | quality | | resistance |
| | | Initial | after | after | | (Ten |
| | Initial | dot | forced | forced | Migration | thousand |
| | sensitivity | quality | aging | aging | score | prints) |
| Plate | (mj/cm²) | (1-100%) | (mj/cm²) | (1-100%) | (1-10) | |
|---|---|---|---|---|---|---|
| Comparative example 17 | 120 | 2-99 | 155 | 3-98 | 8 | 7.2 |
| Comparative example 18 | 130 | 2-98 | 160 | 3-97 | 7 | 5.7 |
| Comparative example 19 | 120 | 1-98 | 140 | 3-98 | 9 | 8.7 |
| Comparative example 20 | 125 | 1-99 | 145 | 2-97 | 9 | 8.3 |
| Comparative example 21 | 120 | 2-99 | 150 | 2-98 | 8 | 7.5 |
| Comparative example 22 | 130 | 2-99 | 160 | 3-98 | 7 | 7.8 |

Example 22

The above are only the preferred embodiments of the present disclosure, but the protection scope of the present disclosure is not limited thereto. It should be pointed out that for a person skilled in the art and a technician familiar with the art, without departing from the overall concept of the present disclosure, equivalent replacements or changes according to the technical solutions and the inventive concept of the present disclosure, and some changes and improvements should also be regarded as the protection scope of the present disclosure.

The invention claimed is:

1. An iodonium salt initiator selected from the group consisting of the following:

D1 having the following structure:

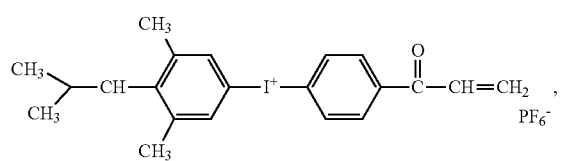

D2 having the following structure:

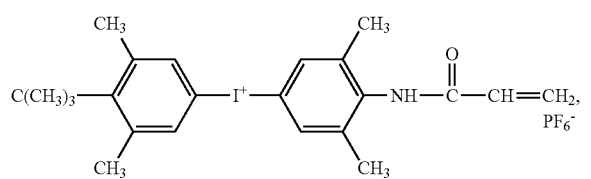

D3 having the following structure:

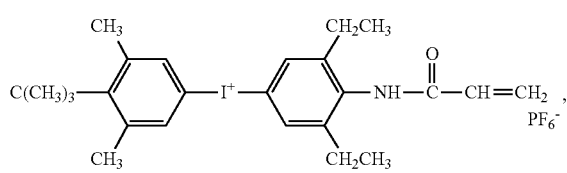

D4 having the following structure:

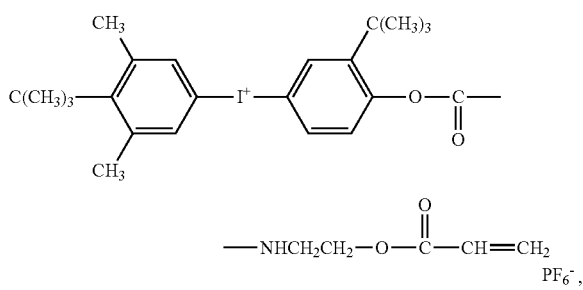

D5 having the following structure:

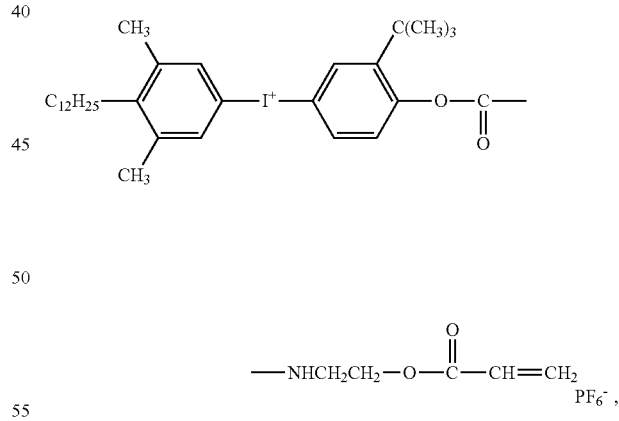

D6 having the following structure:

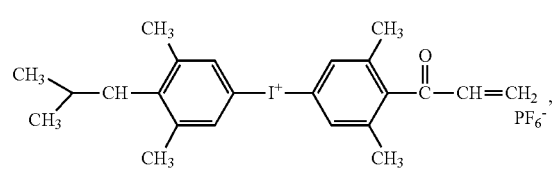

D7 having the following structure:
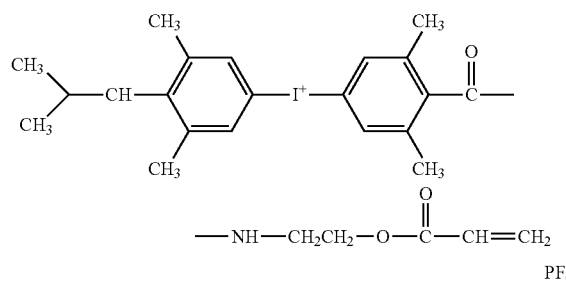
D8 having the following structure:
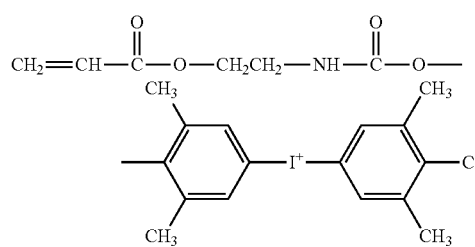
D9 having the following structure:
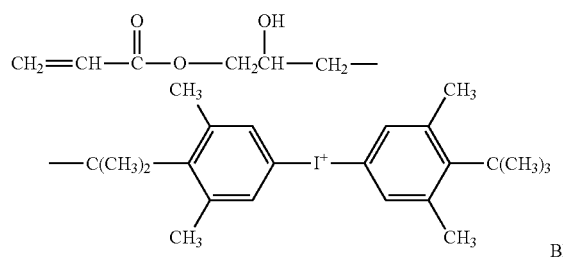
D10 having the following structure;
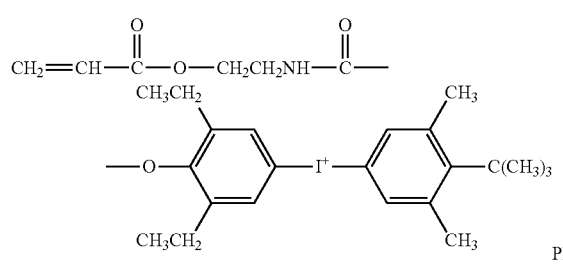
D11 having the following structure:
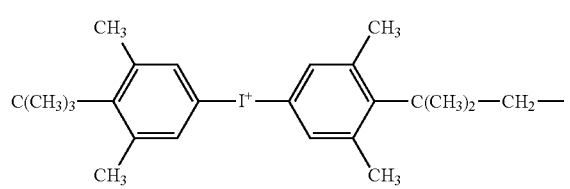
-continued
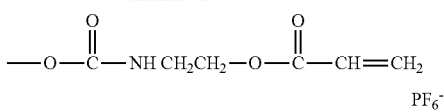
D12 having the following structure:
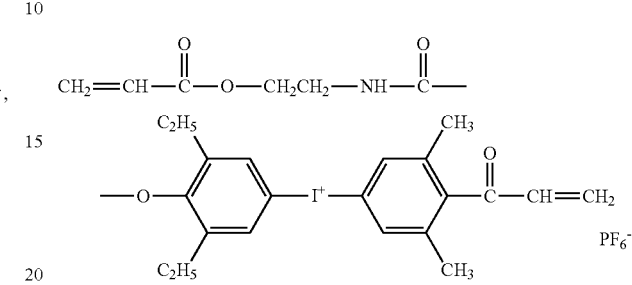
D13 having the following structure:
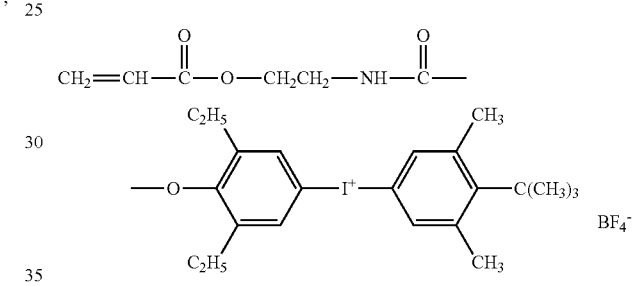
D14 having the following structure:
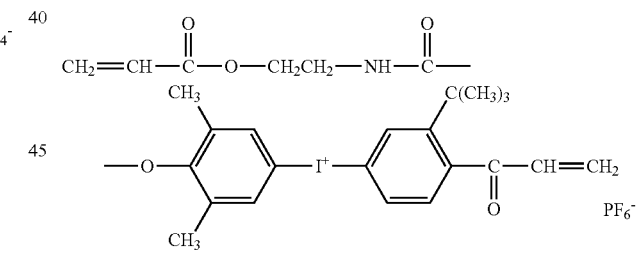
D15 having the following structure:
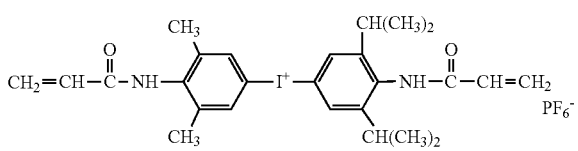
D16 having the following structure:
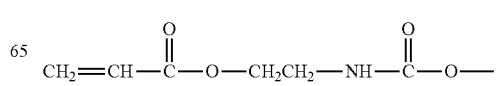

-continued

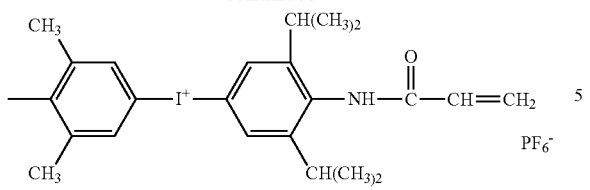

D17 having the following structure:

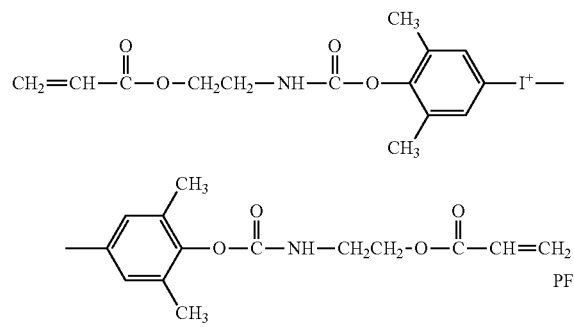

D18 having the following structure:

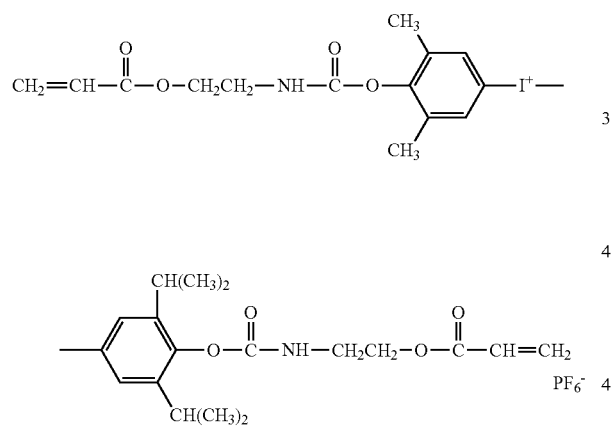

D19 having the following structure:

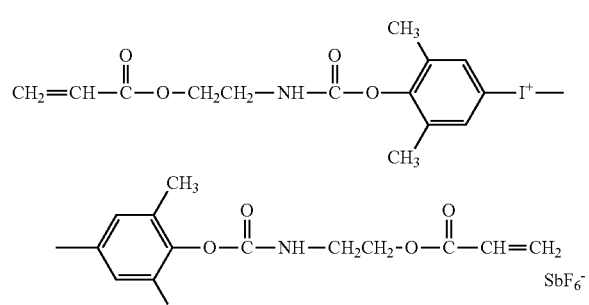

D20 having the following structure:

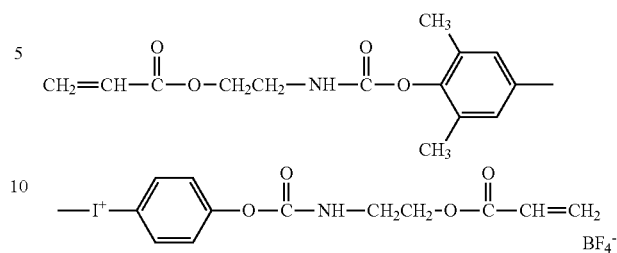

D21 having the following structure:

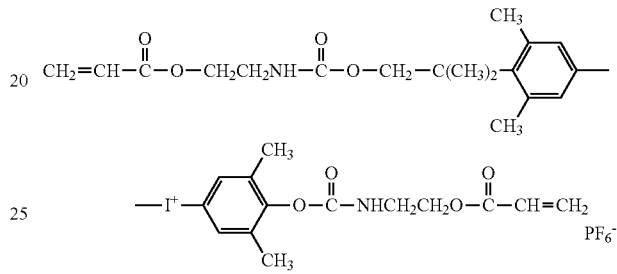

D22 having the following structure:

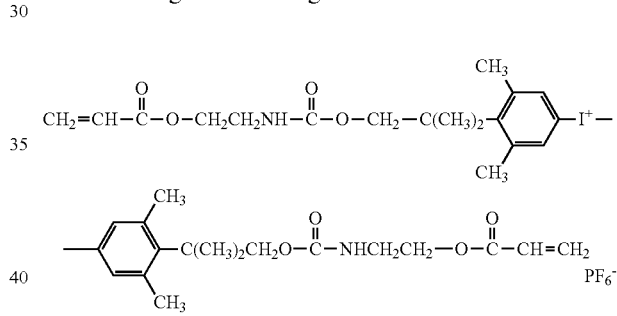

and
D23 having the following structure:

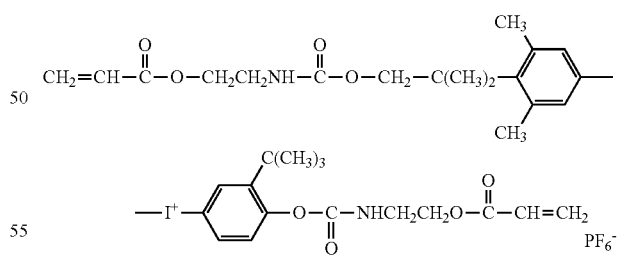

2. A processing-free thermally sensitive plate precursor, wherein the processing-free thermally sensitive plate precursor comprises a carrier and an imaging layer, the imaging layer comprises a hydrophilic thermosensitive resin, a cross-linkable prepolymer, a thermal initiator and an infrared absorber, and the thermal initiator is the iodonium salt initiator according to claim 1.

3. The processing-free thermally sensitive plate precursor according to claim 2, wherein in the imaging layer by weight percentage, the hydrophilic thermosensitive resin accounts for 40-80% of the total solids of the composition, the crosslinkable prepolymer accounts for 10-50% of the total solids of the composition, the thermal initiator accounts for 1-10% of the total solids of the composition, and the infrared absorber accounts for 1-10% of the total solids of the composition.

4. The processing-free thermally sensitive plate precursor according to claim 2, wherein a protective layer is further arranged on the imaging layer.

5. The processing-free thermally sensitive plate precursor according to claim 2, wherein the hydrophilic thermosensitive resin is a polyolefin resin with a branched chain containing a hydrophilic group and an epoxy group; and the crosslinkable prepolymer is a multifunctional acrylic monomer or a multifunctional polyurethane acrylic monomer.

6. The processing-free thermally sensitive plate precursor according to claim 5, wherein the hydrophilic thermosensitive resin is a polyolefin resin at least containing a polyether acrylate or an acrylamide hydrophilic copolymer unit and an epoxy acrylate copolymer unit on a copolymerized chain.

7. The processing-free thermally sensitive plate precursor according to claim 5, wherein the hydrophilic thermosensitive resin is a polyolefin resin obtained by copolymerization of styrene, poly(ethylene glycol) methyl ether methacrylate (number-average molecular weight Mn=2,000), isopropylacrylamide, and 3,4-epoxycyclohexyl methacrylate; and based on weight percentage, the styrene accounts for 30-70%, the poly(ethylene glycol) methyl ether methacrylate (number-average molecular weight Mn=2,000) accounts for 5-20%, the isopropylacrylamide accounts for 5-20%, and the 3,4-epoxycyclohexyl methacrylate accounts for 10-30%.

8. The processing-free thermally sensitive plate precursor according to claim 2, wherein the hydrophilic thermosensitive resin is a discrete particle with a particle diameter of 50-200 nm.

9. The processing-free thermally sensitive plate precursor according to claim 2, wherein the infrared absorber is a cyanine dye with an absorption peak at 750-850 nm and a carrier is an aluminum plate base subjected to electrolytic roughening and anodizing treatment.

10. A processing-free thermally sensitive plate, prepared from the processing-free thermally sensitive plate precursor according to claim 2.

11. The use of the processing-free thermally sensitive plate according to claim 10, wherein after the thermally sensitive plate is scanned and exposed by using a thermally sensitive CTP plate maker, the plate is loaded on a printing press for printing after water washing and developing or directly loaded on a printing press for developing in a fountain solution and printing.

* * * * *